Sept 10, 1957 A. H. PEZZILLO ET AL 2,805,626
UNITARY MOTOR AND TURBINE PUMP
Filed June 9, 1954 2 Sheets-Sheet 1

INVENTORS
Anthony H. Pezzillo
William A. Lignelli
BY
William R. Glisson
ATTORNEY

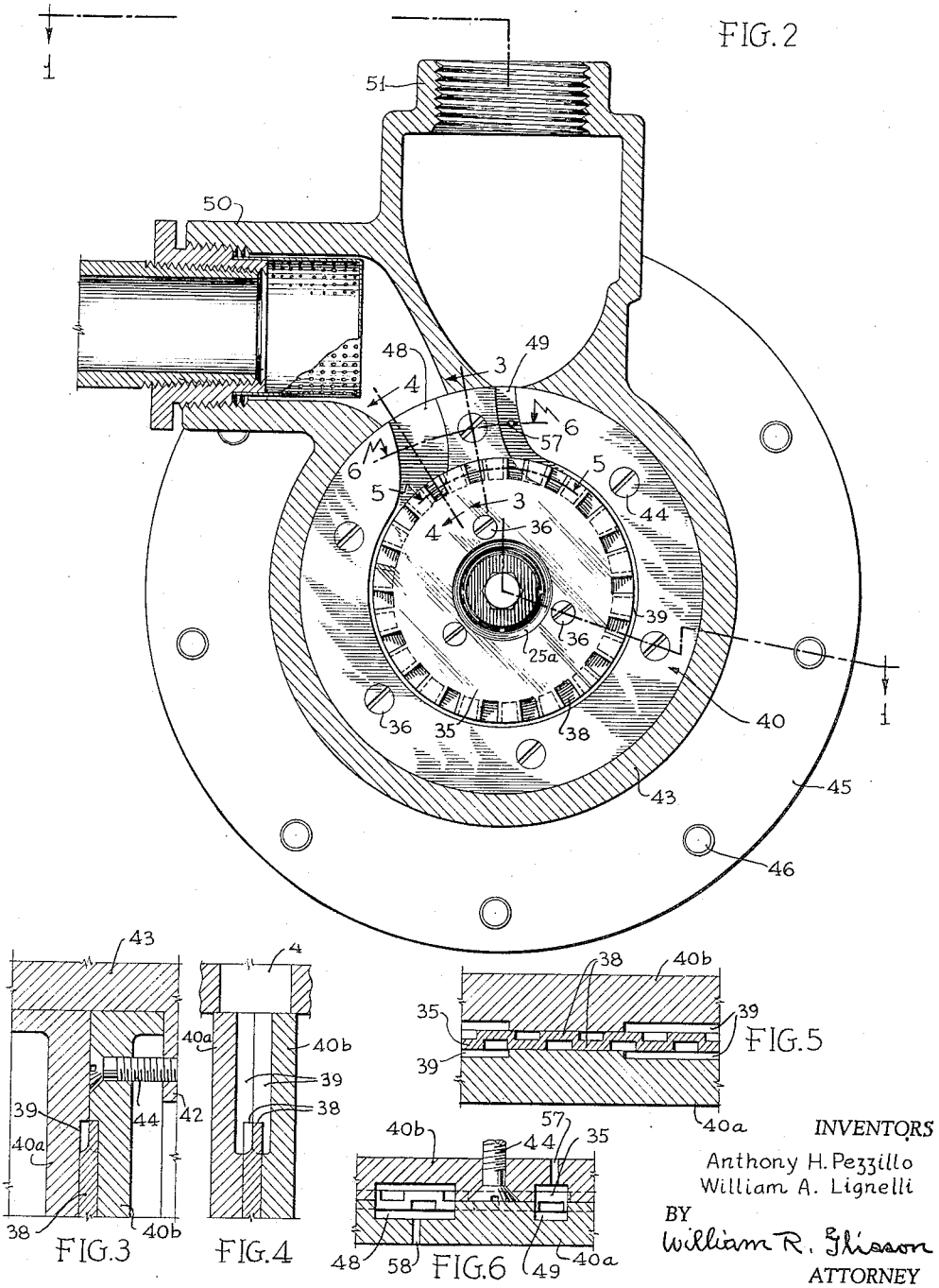

United States Patent Office 2,805,626
Patented Sept. 10, 1957

2,805,626

UNITARY MOTOR AND TURBINE PUMP

Anthony H. Pezzillo and William A. Lignelli, Philadelphia, Pa.

Application June 9, 1954, Serial No. 435,500

10 Claims. (Cl. 103—87)

This invention relates to a unitary motor and turbine pump arranged within a common casing or housing enclosure and has for an object the provision of improvements in this art.

One of the particular objects is to provide a simple, compact and sturdy motor and turbine pump unit in which all parts are sealed together in a common housing so that the unit may be operated while completely submerged in a liquid, if desired.

Another object is to provide a motor-pump assembly in which the only moving part is the rotor-hub-impeller unit.

Another object is to provide a motor-pump unit in which the motor windings and rotor are hermetically sealed in non-corrodible closures so that the interior otherwise may be kept filled with the liquid being pumped.

Another object is to provide a motor-pump unit which is adapted to handle hot or corrosive liquids without injury to any of the parts.

Another object is to provide a turbine pump casing and rotor which have the precise fit in the operating parts required for the functioning of such a pump but which provide for sufficient leakage into the common motor-pump casing to keep the bearings lubricated with the liquid and to keep the parts cooled down to the temperature of the liquid.

Another object is to control the leakage from the pump casing so as to create a greater pressure on one side of the pump casing than on the other so as to maintain a circulation within the common motor-pump housing.

Another object is to provide means for introducing lubricant or another liquid or for measuring vacuum at the motor shaft.

The above and other objects and advantages of the invention will be apparent from the following description of an exemplary embodiment, reference being made to the accompanying drawings wherein:

Fig. 2 is a transverse section and end elevation, the section being taken on the line 2—2 of Fig. 1;

Fig. 3 is a section on the line 3—3 of Fig. 2;

Fig. 4 is a section on the line 4—4 of Fig. 2;

Fig. 5 is a section on the line 5—5 of Fig. 2; and

Fig. 6 is a section on the line 6—6 of Fig. 2.

Figure 1:
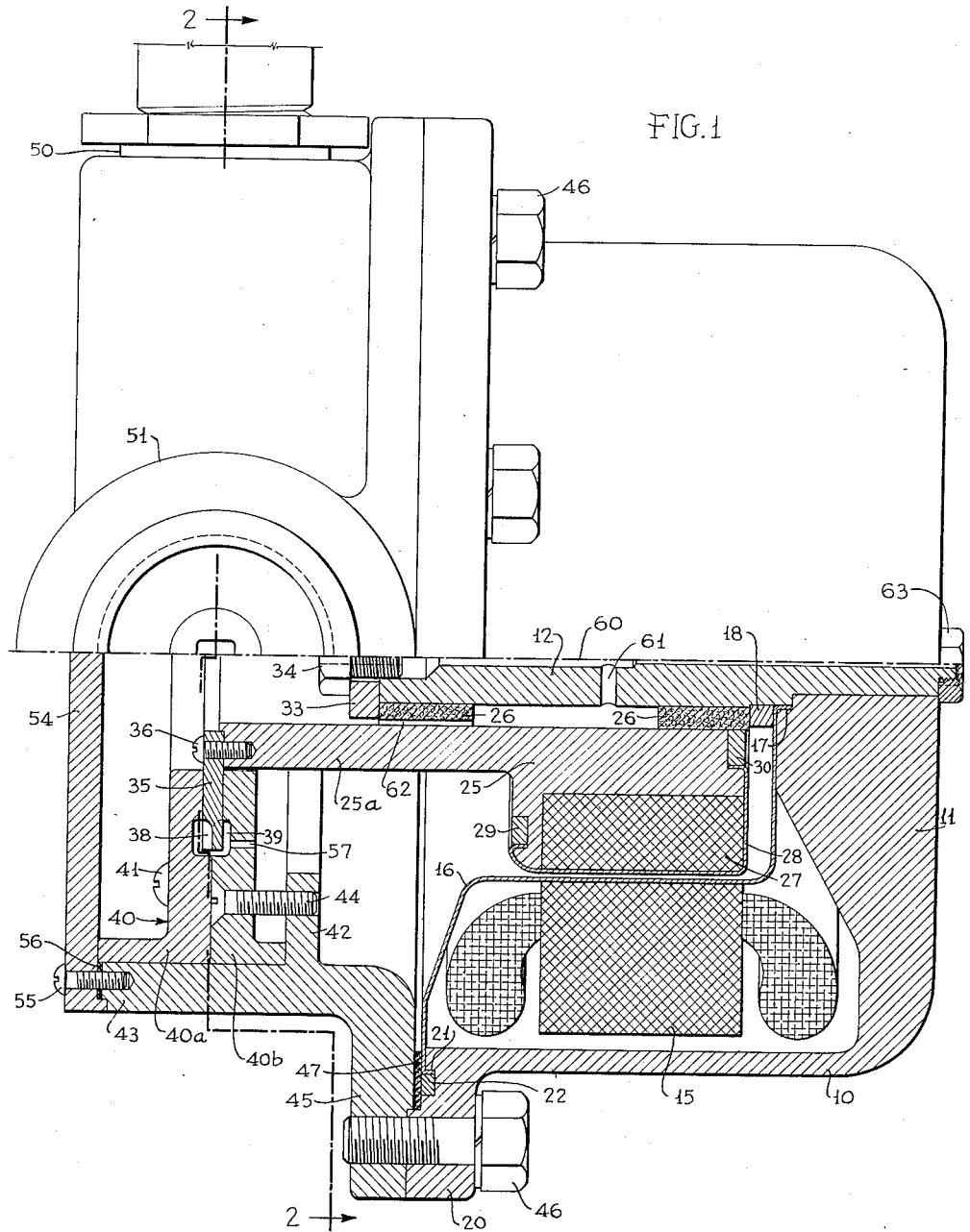
Fig. 1 is an axial section and elevation through a motor and turbine pump unit embodying the invention.

The illustrated device comprises a cup-shaped motor housing or casing shell 10 having a bottom 11 which is thickened at the center and which has a stud shaft 12 force-fitted therein. The shaft is preferably made of a non-corrodible metal such as stainless steel.

Motor stator windings 15 are secured within the outer part of the shell 10 and are fully enclosed by a cup-shaped outwardly flanged shield 16 of non-corrodible metal such as stainless steel. The shield 16 has a bottom opening with a downturned flange 17 surrounding the shaft 12 and the shield is held down tightly in sealing relationship by a metal ring 18 engaged by an annular shoulder on the shaft and pressed down when the shaft is driven into its socket.

The outer end of the shell 10 is turned out to form a flange 20 and in the end face of this flange there is formed an annular groove into which the return flange 21 of the shield is placed. The flange 21 is tightly sealed in the groove by driving an annular metal ring 22 into the groove beside it. Both the shell 10 and the stainless steel shield 16 are imperforate continuous walled enclosures for the stator windings so that the windings are hermetically sealed. The space within the shield 16 is filled with an insulating material which can be injected through a small opening and which will solidify without air to form a firm backing for the thin metal shield.

A hollow rotor 25 of non-corrodible material such as stainless steel is rotatably mounted on the fixed stud shaft 12, self-lubricating bearings 26 of known type, including such material as graphite or "Graphitar," being pressed into the interior of the rotor and being rotatable on the shaft 12. An armature 27 is mounted in a reduced end portion of the rotor and is fully covered and sealed by a shield 28 of non-corrodible material such as stainless steel. The rotor at the ends is provided with annular grooves into which inturned flanges of the shield 28 are placed and these flanges are held and sealed by annular rings 29 and 30 which are driven into the grooves beside them.

The rotor is retained by a cap 33 which engages the outer end of the outer bearing sleeve, the cap being retained by a cap bolt 34 threaded into the end of the shaft. The rotor is extended to form a hollow hub 25a which carries a turbine pump runner disk 35, screws 36 being used to secure the disk on the hub and shims being used between hub and disk if necessary to obtain the very accurate positioning required.

The turbine runner disk 35 has turbine blades 38 on its outer edge, the blades operating in a chamber 39 of a turbine pump casing 40. The casing 40 is formed of two halves 40a and 40b which are secured together by screws 41. The inner half 40b of the casing is secured to an inwardly directed flange 42 of a main casing shell 43 by screws 44. An outturned flange 45 of the shell 43 is secured to the flange 20 of the main casing shell 10 as by cap screws 46. The space between the shell flanges 45 and 20 is sealed by a ring 47 of heat and acid resistant sealing material.

As shown in Fig. 2, the main part of the turbine chamber 39 is larger than the bladed portion of the rotor disk, but between the intake and discharge openings 48 and 49 the chamber fits the rotor very closely, as shown in Figs. 3, 5 and 6, to separate the intake from the discharge. The inner part of the pump rotor disk fits very closely in the space between the halves of the pump casing but no packing is used so there can be a very small amount of permissible liquid leakage here. Similarly, there may be leakage between the casing parts outside the rotor. The casing parts fit with close machined tolerance within the casing shell 43, but there is still a very small amount of permissible leakage here.

Pipe receptors 50 and 51 lead from the intake and discharge passages 48 and 49.

The open outer end of the casing shell 44 is closed by a cap plate 54 secured by cap screws 55, a heat and acid resistant sealing ring 56 being secured between the adjacent faces.

Liquid tends to be forced out of the pump casing toward the outside and tends to be drawn in at the inside on the sides of the turbine disk 35. There is enough leakage, as stated, to cause circulation in the main casing outside the turbine pump casing, but since this outside space itself is tightly enclosed the liquid is maintained under pressure all around the turbine casing so that there is no loss of efficiency in the operation of the turbine pump. If desired, a very small hole 57 may be formed in the pump casing part 40b at the discharge passage 49 to cause circulation outward to occur more toward this side than toward the other side, thus further producing controlled circulation and constant exchange of liquid in the main casing. Another small hole 58 may be formed in the other pump casing part at the intake passage 48 to provide for a limited inflow of liquid to the pump chamber from the outer end of the motor chamber.

The shaft 12 is formed with an axial passage 60 extending throughout its length and opening in a passage 61 to the space in which the bearings are located. The bearing 26 near the end of the shaft is provided with passages 62 to permit liquid to flow out. The passages 60, 61, 62 may be used for various purposes when a cap nut 63 is replaced by suitable fittings, as for introducing lubricant, for measuring vacuum or for introducing another liquid to be mixed with the principal liquid being handled by the pump. Passage 58 in the pump casing aids in the last-named function.

It will be noted that the assembly has been carefully designed for efficient operation and convenient assembly and dis-assembly in various ways.

The usual procedure in making the assembly is to first secure the rotor 25, carrying the ring bearings 26 fast in fixed position within the interior bore thereof, on the fixed shaft 12 by the cap 33 and cap bolt 34. Then the inner part 40b of the turbine casing is secured by the screws 44 to the flange 42 of the main casing part 43. The main casing parts 10 and 43 will have first been secured together by the cap bolts 46. Then the turbine runner or disk 35 is secured on the hub extension 25a of the rotor by screws 36, suitable shims being used if needed to make a very close running machine fit between the turbine disk and the turbine casing part 40b. Next the casing part 40a is secured to the part 40b by screws 41. Finally, the cap plate 54 is secured by cap screws 55. The entire motor and turbine pump unit is now hermetically sealed in the main casing and although fluid circulates through the intake and discharge openings and within the main casing, there is no leakage at all from the main casing.

The parts may be separated in reverse order to assembly or may be disassembled in different ways. For example, after taking off the end cap 54 and taking off the cap bolt 34 the whole pump end portion of the unit may be separated by removing the cap bolts 46.

If it is desired to leave the rotor in place, the end cap 54 is taken off, then the cap screws 36 securing the pump disk to the hub are removed, after which the cap bolts 46 are removed.

For handling corrosive fluid all of the interior parts may be formed of anti-corrosive material, such for example, as stainless steel.

If only access to the turbine chamber is desired, the end cap 54 is removed, then the cap screws 41, and the outer turbine casing 40a is removed.

It is thus seen that the invention provides a simple, economical, inexpensive and convenient assembly wherein both motor and pump units are sealed together in a common casing which may be quickly assembled and separated and which provides interior liquid circulation.

While one embodiment has been illustrated and described, it is to be understood that there may be various embodiments within the general scope of the invention.

What is claimed is:

1. A motor-turbine-pump unit comprising in combination, a fully enclosed main casing, a motor unit mounted in one end of the main casing and including a stator arranged on the inner periphery of the casing, an imperforate shield of non-magnetic material enclosing the stator, a fixed shaft secured in the end of the casing, a rotor carrying bearings rotatable on the fixed shaft, a cap screw securing the rotor on said fixed shaft, an armature on said rotor, an imperforate shield of non-magnetic material enclosing the armature, a turbine impeller disk removably mounted on a hub extension of said rotor, and a two-part circumferentially divided casing for the pump impeller carried wholly within said main casing and removable from the end of the main casing, the impeller having an inner disk portion and an outer bladed portion and the casing having an inner portion fitting the sides of the disk portion of the impeller and an outer chamber portion for the bladed portion of the impeller, the main casing being kept filled with liquid being circulated by said turbine pump.

2. A motor-turbine-pump unit comprising in combination, a fully enclosed main casing, a motor unit mounted in one end of the main casing and including a stator arranged on the inner periphery of the casing, an imperforate shield of non-magnetic material enclosing the stator, a fixed shaft secured in the end of the casing, a rotor carrying bearings rotatable on the fixed shaft, a cap screw securing the rotor on said fixed shaft, an armature on said rotor, an imperforate shield of non-magnetic material enclosing the armature, a turbine impeller disk removably mounted on a hub extension of said rotor, and a two-part circumferentially divided casing for the pump impeller carried wholly within said main casing and removable from the end of the main casing, the impeller having an inner disk portion and an outer bladed portion and the casing having an inner portion fitting the sides of the disk portion of the impeller and an outer chamber portion for the bladed portion of the impeller, the main casing being kept filled with liquid being circulated by said turbine pump, said stator shield being cup-shaped with an outflared flange at the open end secured between separable parts of the casing and having an opening and an axial flange in its bottom to receive a reduced portion of said fixed shaft, said fixed shaft having a shoulder cooperating with the axially flanged end of the main casing to seal the stator shield around its bottom opening.

3. A motor-turbine-pump unit comprising in combination, a fully enclosed main casing, a motor unit mounted in one end of the main casing and including a stator arranged on the inner periphery of the casing, an imperforate shield of non-magnetic material enclosing the stator, a fixed shaft secured in the end of the casing, a rotor carrying bearings rotatable on the fixed shaft, a cap screw securing the rotor on said fixed shaft, an armature on said rotor, an imperforate shield of non-magnetic material enclosing the armature, a turbine impeller disk removably mounted on a hub extension of said rotor, and a two-part circumferentially divided casing for the pump impeller carried wholly within said main casing and removable from the end of the main casing, the impeller having an inner disk portion and an outer bladed portion and the casing having an inner portion fitting the sides of the disk portion of the impeller and an outer chamber portion for the bladed portion of the impeller, the main casing being kept filled with liquid being circulated by said turbine pump, said rotor shield fully covering the periphery of the rotor and having inturned end flanges with return flanges entering grooves in the ends of the rotor, and rings driven in the grooves alongside the return flanges of the shield.

4. A motor-turbine-pump unit comprising in combination, a fully enclosed main casing, a motor unit mounted in one end of the main casing and including a stator arranged on the inner periphery of the casing, an imperforate shield of non-magnetic material enclosing the stator, a fixed shaft secured in the end of the casing, a rotor carrying bearings rotatable on the fixed shaft, a cap screw securing the rotor on said fixed shaft, an armature on said rotor, an imperforate shield of non-magnetic material enclosing the armature, a turbine impeller disk removably mounted on a hub extension of said rotor, and a two-part circumferentially divided casing for the pump impeller carried wholly within said main casing and removable from the end of the main casing, the impeller having an inner disk portion and an outer bladed portion and the casing having an inner portion fitting the sides of the disk portion of the impeller and an outer chamber portion for the bladed portion of the impeller, the main casing being kept filled with liquid being circulated by said turbine pump, said turbine pump casing comprising two transversely facing parts, one part secured to a flange within a part of the main casing which is separable from the part carrying the motor and the other part of the pump casing being disconnectibly secured to the part of the pump casing which is secured to the main casing, and a removable head or cap sealingly secured to the outer end of the main casing.

5. A motor-turbine-pump unit comprising in combination, a fully enclosed main casing, a motor unit mounted in one end of the main casing and including a stator arranged on the inner periphery of the casing, an imperforate shield of non-magnetic material enclosing the stator, a fixed shaft secured in the end of the casing, a rotor carrying bearings rotatable on the fixed shaft, a cap screw securing the rotor on said fixed shaft, an armature on said rotor, an imperforate shield of non-magnetic material enclosing the armature, a turbine impeller disk removably mounted on a hub extension of said rotor, and a two-part circumferentially divided casing for the pump impeller carried wholly within said main casing and removable from the end of the main casing, the impeller having an inner disk portion and an outer bladed portion and the casing having an inner portion fitting the sides of the disk portion of the impeller and an outer chamber portion for the bladed portion of the impeller, the main casing being kept filled with liquid being circulated by said turbine pump, the entire assembly being free of packed rotary bearings and the parts of the pump casing being fitted on machined surfaces which permit and promote limited circulation from the pump casing to keep the main casing filled and to maintain a liquid circulation therein.

6. A motor-turbine-pump unit comprising in combination, a fully enclosed main casing, a motor unit mounted in one end of the main casing and including a stator arranged on the inner periphery of the casing, an imperforate shield of non-magnetic material enclosing the stator, a fixed shaft secured in the end of the casing, a rotor carrying bearings rotatable on the fixed shaft, a cap screw securing the rotor on said fixed shaft, an armature on said rotor, an imperforate shield of non-magnetic material enclosing the armature, a turbine impeller disk removably mounted on a hub extension of said rotor, and a two-part circumferentially divided casing for the pump impeller carried wholly within said main casing and removable from the end of the main casing, the impeller having an inner disk portion and an outer bladed portion and the casing having an inner portion fitting the sides of the disk portion of the impeller and an outer chamber portion for the bladed portion of the impeller, the main casing being kept filled with liquid being circulated by said turbine pump, the entire assembly being free of packed rotary bearings and the parts of the pump casing being fitted on machined surfaces which permit and promote limited circulation from the pump casing to keep the main casing filled and to maintain a liquid circulation therein, said turbine pump casing having a small axially directed opening on one side at the discharge position to promote a controlled circulation of liquid in said main casing.

7. A motor-turbine-pump unit comprising in combination, a fully enclosed main casing, a motor unit mounted in one end of the main casing and including a stator arranged on the inner periphery of the casing, an imperforate shield of non-magnetic material enclosing the stator, a fixed shaft secured in the end of the casing, a rotor carrying bearings rotatable on the fixed shaft, a cap screw securing the rotor on said fixed shaft, an armature on said rotor, an imperforate shield of non-magnetic material enclosing the armature, a turbine impeller disk removably mounted on a hub extension of said rotor, and a two-part circumferentially divided casing for the pump impeller carried wholly within said main casing and removable from the end of the main casing, the impeller having an inner disk portion and an outer bladed portion and the casing having an inner portion fitting the sides of the disk portion of the impeller and an outer chamber portion for the bladed portion of the impeller, the main casing being kept filled with liquid being circulated by said turbine pump, said turbine pump casing being slightly open at the interior at the sides of the impeller disk to permit liquid to be drawn into the pump casing along the sides of the impeller disk.

8. A motor-turbine-pump unit comprising in combination, a main casing, a motor rotor operably mounted in said main casing, a pump casing mounted in said main casing, an impeller in said pump casing driven by said rotor, intake and discharge openings for said pump casing to the outside of the main casing for circulating a liquid, the pump also having means for circulating some of said liquid within said main casing, and a fluid passage along the rotor axis and extending out of the main casing for measuring vacuum, introducing lubricant or for introducing a second liquid to said main casing to be mixed with the first said liquid circulated by the pump, said pump casing having an intake opening between its intake passage and the interior of the main casing for the intake of liquid from the main casing into the pump casing.

9. A motor-turbine-pump unit comprising in combination, a main casing, a motor rotor operably mounted in said main casing, a pump casing mounted in said main casing, an impeller in said pump casing driven by said rotor, intake and discharge openings for said pump casing to the outside of the main casing, the pump also having means for circulating liquid within said main casing, and a fluid passage along the rotor axis and extending out of the main casing for measuring vacuum, introducing lubricant or for introducing a second liquid to said main chamber to be mixed with the principal liquid circulated by the pump, the rotor turning on a fixed shaft which carries said axial passage, means providing passage of liquid from said axial passage to the interior of the main chamber, and small passages in the pump casing between the interior of the main casing and the intake and discharge passages respectively of the pump casing for circulating fluid from the main casing and back thereinto.

10. A motor-turbine-pump unit comprising in combination, a main casing, a motor rotor operably mounted in said main casing, a pump casing mounted in said main casing, an impeller in said pump casing driven by said rotor, intake and discharge openings for said pump casing to the outside of the main casing, the pump also having means for circulating liquid within said main casing, and a fluid passage along the rotor axis and extending out of the main casing for measuring vacuum, introducing lubricant or for introducing a second liquid to said main chamber to be mixed with the principal liquid circulated by the pump, the rotor turning on a fixed shaft which carries said axial passage, means providing passage of liquid from said axial passage to the interior of the main chamber, and small passages in the pump casing between the interior of the main casing and the intake and discharge passages respectively of the pump casing for circulating fluid from the main casing and back thereinto, the passage for liquid between the axial passage and the interior of the main casing comprising an axial channel formed in the outer surface of bearings on which said rotor rotates.

References Cited in the file of this patent

UNITED STATES PATENTS

| | | |
|---|---|---|
| 2,318,786 | Korte et al. | May 11, 1943 |
| 2,649,048 | Pezzillo et al. | Aug. 18, 1953 |
| 2,669,187 | Guyer | Feb. 16, 1954 |